Jan. 1, 1952   W. F. STREHLOW   2,580,481
FARM TRACTOR

Filed April 5, 1948   3 Sheets-Sheet 1

Fig. 1

Inventor
Walter F. Strehlow
By Kimball & Wyman
Attorney

Fig. 2

Jan. 1, 1952 W. F. STREHLOW 2,580,481
FARM TRACTOR
Filed April 5, 1948 3 Sheets-Sheet 3

Inventor
Walter F. Strehlow
by Kimball & Wyman
Attorney

UNITED STATES PATENT OFFICE 2,580,481

FARM TRACTOR

Walter F. Strehlow, Wauwatosa, Wis., assignor to Allis-Chalmers Manufacturing Company, Milwaukee, Wis., a corporation of Delaware Application April 5, 1948, Serial No. 18,930

13 Claims. (Cl. 180—1)

This invention relates generally to a tractor adapted for mounting agricultural implements thereon, and is more specifically directed toward a tractor particularly suited for mounting the various tools forward of the operator's station.

Vegetable farming usually involves raising a variety of crops planted in closely spaced rows on relatively flat land. And in order to obtain the most efficient use of the available land, different crops should be spaced apart distances conforming with the nature and requirement of each crop. For example, some crops require a row spacing of only ten inches whereas other crops may require a row spacing of twelve, fourteen or more inches. Consequently the mechanical performance of operations such as planting and cultivating vegetable crops necessitates a design and construction of tractor effective to span any desired number of rows of any given spacing. And it is important that the tractor be of light weight inasmuch as the tire width of the wheel must be such as to afford an adequate support for the tractor and yet be narrow enough to travel between closely spaced rows without damaging the plants therein.

Moreover, in working with closely aligned crop rows it is essential that the design and construction of the tractor be such as to afford an operator seated on the tractor a practically unrestricted close range view of the implements and the plant rows and such as to afford a quick response of the implements to any change in the direction of travel of the tractor. And in this connection, best operating results are obtained when the implements are positioned in the area between and directly behind the front dirigible wheels as the implements closely follow the steering movements of these wheels and as the operator's line of vision including the implements is sufficiently forward to obtain excellent steerability.

In addition, the matter of maneuverability, other than steering, is also important in that even narrow tread tires travel relatively close to the plants in rows spaced apart a distance of only ten inches and it is sometimes desirable to quickly stop or change the speed of travel as the soil or crop conditions change. Consequently it is essential that controls, such as the change speed lever, the clutch pedal and the brake pedals be readily accessible for operation as desired without interfering with steerability and without requiring the operator to look away from the plant rows or tool.

Attainment of the mode of operation aforementioned involves features not present in the design and construction of agricultural tractors heretofore known and used. And in operating these known tractors it is customary, usually because of the operator's inability to simultaneously view all tool rigs at close range, to cultivate with tools spaced a sufficient distance from the plants to avoid uprooting the plants in the event the crop rows are irregularly aligned or spaced. This results in incomplete cultivation which must be followed up by the tedious and time consuming procedure of hand weeding. Consequently considerable time is required to complete any such operation and as a result labor costs are invariably too high and a lack of labor or time frequently results in crop damage or loss from inability to plant and/or care for a crop at the most opportune time.

It is therefore an object of this invention to provide an improved tractor incorporating features of construction and combination affording material advantages as to maneuverability when viewing crops and tools at a position forward of the operator's station and beneath the tractor structure.

Another object of the present invention is to provide a tractor with improved features of construction and arrangement affording an operator seated on the tractor a practically unrestricted close range view of the area directly behind and between the front dirigible wheels of the tractor along a line of vision directed sufficiently forward to obtain excellent steerability.

Another object of this invention is to provide a tractor incorporating parts constructed and combined for coaction in an improved manner permitting one or more tools to be mounted thereon in depending relation thereto along a transverse line directly behind and parallel to the front axle structure so as to position the tools for quick response to steering movements of the tractor front wheels.

Another object of the present invention is to provide a tractor incorporating parts constructed and combined so as to minimize the overall height and length of the tractor without interfering with maneuverability or steerability and without compelling the operator to maintain an unnatural and uncomfortable position, particularly when working vegetable crops planted in closely spaced rows.

Another object of the present invention is to provide an improved tractor structure including a front axle structure having a radius rod designed and positioned to be clear of the operator's line of vision when seated on the tractor and looking forward and downward toward the ground directly behind and between the front wheels and/or to divert crops in adjacent rows which are straddled by the front axle structure and have attained a height greater than the ground clearance thereof, away from the tractor center structure, particularly steering gears.

It is also an object of this invention to provide a tractor including features of improvement as to the construction and combination of parts, all to the end of affording a simplified, compact and durable structure which is relatively inexpensive to manufacture and service.

The advantages inherent in the above stated objects and other advantages will become readily apparent as the disclosure progresses and particularly points out the various features of this invention. And accordingly, the present invention may be considered as comprising the various constructions, combinations and/or subcombinations of parts as is hereinafter more fully set forth in the detailed description and appended claims, reference being had to the accompanying drawings in which:

Figure 1:
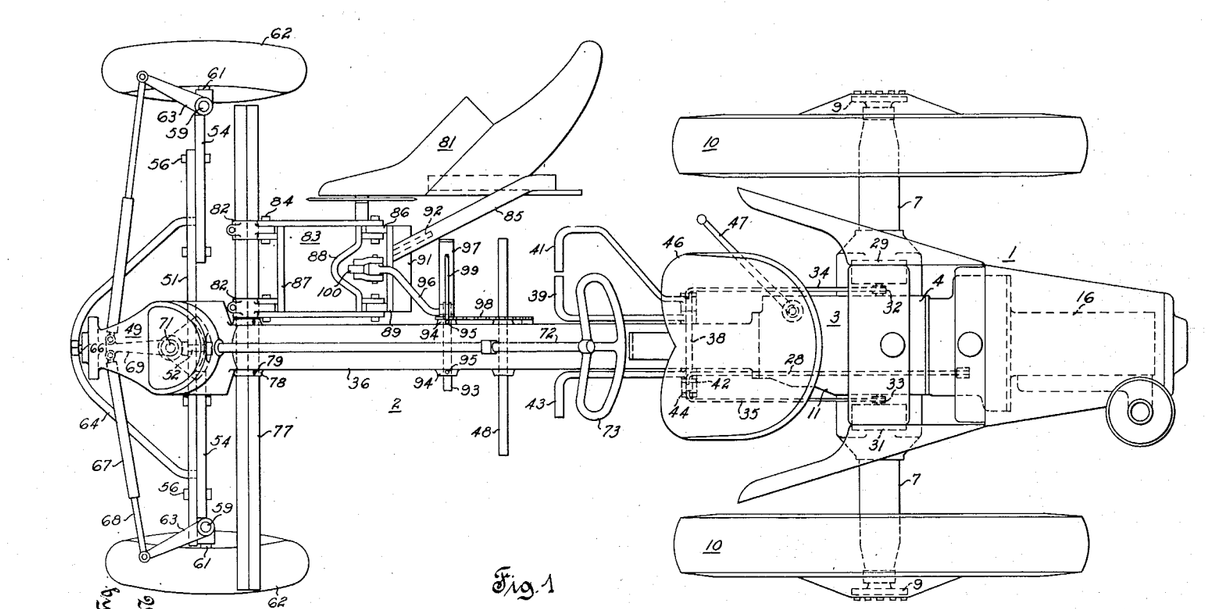
Fig. 1 is a plan view of a tractor-implement combination embodying the invention.
Figure 2:
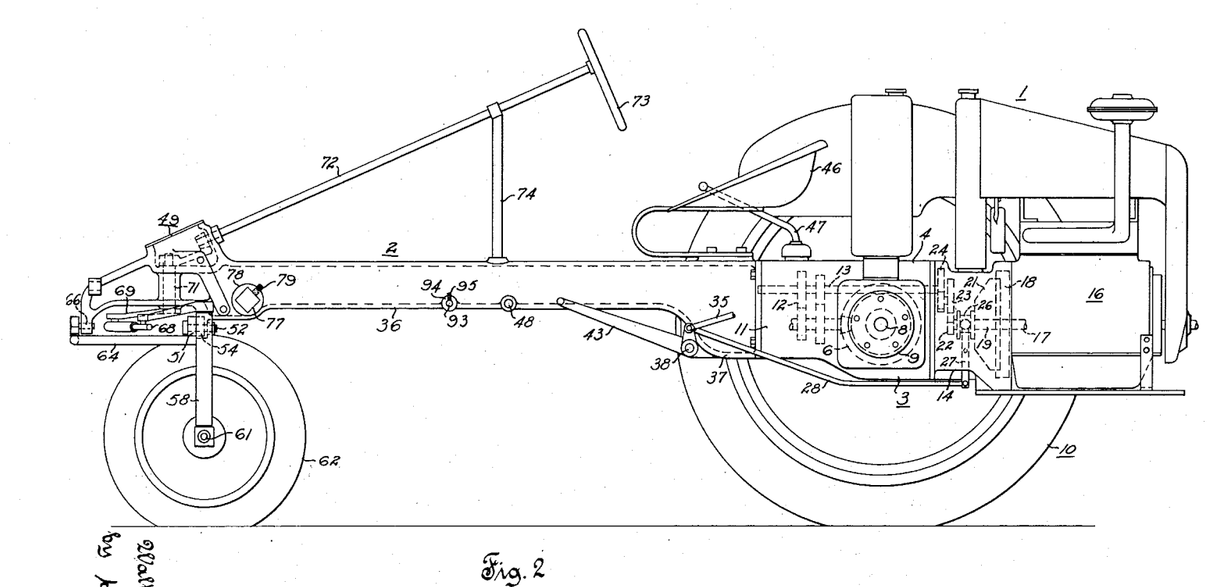
Fig. 2 is a side elevation of the tractor shown in Fig. 1 with the implement and near side front and rear wheels removed to better show the construction and combination of various parts.

Referring to Figs. 1 and 2, it will be seen that a tractor constructed in accordance with the present invention may include a rear driving unit 1 and a forwardly extending frame structure 2. The rear driving unit comprises a transverse axle housing 3 including an enlarged central portion 4 operatively enclosing a conventional differential drive mechanism 6 and including a pair of oppositely projecting axle shaft housing 7 each enclosing an axle shaft 8 having its inner end operatively connected with the differential mechanism. The outer or exposed end of each axle shaft terminates in a radially flanged hub portion 9 adapted for attaching a driving wheel 10 thereto. The central portion 4 of the axle housing 3 includes an integral forwardly extending portion 11 operatively enclosing a change speed gearing 12 drivingly connected with the differential mechanism 6, this gearing including a power input shaft 13 extending rearwardly through the central portion of the axle housing in overlying relation to the differential mechanism therein and into the adjacent end of a clutch and flywheel housing 14 detachably bolted or otherwise rigidly secured to the rear side of the axle housing in rearwardly extending relation thereto.

A convention internal combustion engine power unit 16 is detachably bolted to the rear end of housing 14 and is thereby supported in rearwardly overhanging relation to the central portion 4 of the axle housing, the adjacent end of the engine crank shaft 17 entering housing 14 and having mounted thereon a combined flywheel and clutch element 18. An axially aligned shaft extension 19 mounts a shiftable clutch element 21 selectively engageable with the clutch element fixed to the engine crankshaft 17 in a conventional manner (not shown), and shaft extension 19 has mounted on its end remote from the engine a gear 22 which meshes with suitable gearing 23 in housing 14. Gearing 23 in turn engages gear 24 positioned on the adjacent end of shaft 13 for rotation therewith thus operatively connecting shaft extension 19 in driving relation with power input shaft 13. Power is transmitted through this power input shaft to the change speed transmission 12 and thence through the differential mechanism 6 to the separate rear axle shafts 8 in a conventional manner (not shown). A clutch element shift collar 26 is provided with an arm 27 which extends through an opening in housing 14 and is operatively connected with the rear end of an actuating rod 28 which extends forwardly beneath a portion of the axle housing 3 and along the adjacent side of the forwardly extending portion of the axle housing.

The central enlarged portion 4 of the axle housing 3 also encloses brake means 29 and 31 symmetrically arranged with respect to the longitudinal axis of the forwardly extending portion enclosing the change speed gearing, there being a brake means positioned for association with each axle shaft (note Fig. 1) so as to control rotation thereof for braking and turning purposes as is common practice. Each brake means is provided with a separate actuating arm 32 and 33 operatively connected with a forward and downward extending actuating rod or link 34 and 35, these links being positioned adjacent opposite sides of the forwardly extending portion of housing 4.

A tubular frame member 36 is rigidly bolted or otherwise detachably secured to the forward end of axle housing portion 11 and projects forwardly therefrom on a horizontal level. The rear portion 37 of frame member 36 is preferably somewhat enlarged with respect to the remainder of the tube to give added strength to the connection with the rear axle housing. A shaft 38 extends transversely through the lower front portion of the enlarged rear section 37 of frame member 36 and is rotatably supported in suitable bearings (not shown) mounted in opposite wall portions thereof. Shaft 38 extends laterally beyond opposite sides of frame member 36 and one such projecting shaft portion mounts a pair of adjacent brake pedals 39 and 41 which extend forward and upward to a position adjacent the right side of tubular frame member 36. The other projecting shaft portion mounts a lever arm 42 fixed thereto and a clutch pedal 43 which extends forward and upward to a position on the opposite side of frame member 36 and in approximate lateral alignment with brake pedals 39 and 41. The inner brake pedal 39 is fixed to shaft 38 for turning movement therewith and the outer brake pedal 41 is mounted on the shaft for turning movement relative thereto, the outer pedal 41 being operatively connected with the forward end of the adjacent brake actuating link 34. An arm 44 is fixed to the opposite end portion of shaft 38 for turning movement therewith and is operatively connected with the forward end of brake actuating link 35. Clutch pedal 43 is mounted on shaft 38 for turning movement relative thereto and is operatively connected with the adjacent forward end of clutch actuating rod 28.

The rear top side portion of tubular frame member 36 mounts an operator's station or seat 46 disposed in adjacent overlying relation thereto and in adjacent relation to the front end of forwardly projecting axle housing portion 11. The change speed gearing 12 is provided with a suitable shift lever 47 which extends upward and outward to a point within easy reach of an operator seated at station 46. In addition, it should be noted that the legs of an operator seated at station 46 normally straddle the rearward portion of tubular frame member 36 with the operator's feet disposed for ready engagement with the adjacent brake and clutch pedals. For convenience, tubular frame member 36 may be provided with a foot rest bar 48 which extends laterally beyond the opposite sides thereof in advance of the pedals 39, 41 and 43, this foot rest being disposed for ready engagement by the feet of an operator seated at station 46.

The forward end portion of tubular frame member 36 is rigidly united, as by welding, to a steering control housing 49. A rigid transverse axle bar 51, rectangular in cross section, has a midportion thereof united with a depending portion of housing 49 by means of a bolt 52 affording relative pivoted movement of these parts about a horizontal longitudinal axis. Axle bar 51 projects equal distances laterally beyond the opposite sides of frame member 36 and has its opposite end portions provided with a series of longitudinally spaced holes 53 (see Fig. 3). A pair of rigid stub axle bars 54 are detachably adjustably secured to the rearward side of the opposite end portions of axle bar 51 by means of bolts 56 passing through a pair of longitudinally spaced holes 57 in the stub bars selectively alignable with the series of holes 53 in the axle bar. The outer end of each stub bar rigidly mounts a vertically depending shaft receiving and supporting tube or standard 58 and a shaft 59 is rotatably mounted in each standard, each shaft 59 terminating at its lower end in a laterally projecting spindle 61 supporting a ground engaging wheel 62. The upper end of each shaft 59 is provided with a laterally projecting arm 63 adapted for connection with a steering mechanism.

Figure 3:
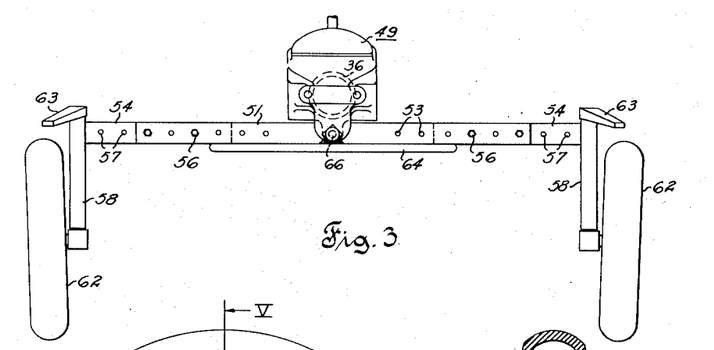
Fig. 3 is a front view of the forward axle structure with parts omitted to better show the tread spacing adjustment afforded thereby.

Axle bar 51 is also additionally braced by means of a radius rod 64 having its midportion supported on a horizontal pivot mounting 66 carried by the front wall or flange of steering control housing 49 and having opposite end portions welded to under side edge portions of axle bar 51. The spindle arms 63 on wheel mounting shafts 59 are each connected, preferably by telescoping link elements 67 and 68, with a steering arm 69 on the lower end of a vertically extending shaft 71 rotatably supported in control housing 49. The upper end of shaft 71 is gear connected with the forward end of a steering shaft 72 which extends rearward and upward in overlying relation with respect to tubular frame member 36 and to a point such that the steering wheel 73 on the rear end thereof is within easy reach of an operator seated at station 46. A rear portion of steering shaft 72 is supported on an upstanding post or bracket 74 carried by a rear portion of underlying frame member 36.

Tubular frame member 36 has transversely aligned openings therethrough in rearward adjacent relation with respect to steering control housing 49 through which a transverse rigid cross bar 77 is rigidly positioned, preferably in a detachable manner through the use of a collar 78 and set screw 79 to prevent axial shifting of the cross bar, cross bar 77 preferably extending equal distances laterally beyond the sides of frame member 36 as shown in Fig. 1. Cross bar 77 provides a support for mounting various agricultural implements thereon in adjacent rearward relation to the front axle, thus positioning the tools for ready response to a change in direction of the tractor and in an area sufficiently forward to give an operator seated on the tractor a practically unrestricted close range view of the tools as they travel along the plant rows. As shown in Fig. 1 a moldboard plow 81 may be mounted on cross bar 77 in a manner hereinafter described.

In the mounting of plow 81, a pair of similar hangers 82 are suitably clamped or otherwise adjustably fixedly secured to a portion of rectangular cross bar 77 adjacent tractor frame 36. Each hanger supports a similar depending rearwardly extending parallel linkage 83 for vertical swinging movement about pivot axes 84 generally parallel to the longitudinal axis of cross bar 77. Each linkage 83 includes a vertically disposed rear link 86 extending downward and rearward, and the two adjacently positioned parallel linkages are rigidly united by a suitable brace means such as spaced members 87 and 88, which connect the upper links of the parallel linkage. In addition, the vertically disposed rear links 86 are rigidly united by a plate member 89 having a horizontal flange 91 projecting rearwardly therefrom and a vertical web member 92 supportingly connecting flange 91 with plate member 89. The plow 81 is rigidly attached to the supporting parallel linkage preferably by welding the plow beam 85 to plate member 89 and flange 91 as shown in Fig. 1. A rock shaft 93 extends through aligned openings in frame member 36 disposed in adjacent rearward relation with respect to the tool supporting linkage 83, this shaft being detachably fixed therein against lateral movement by any suitable means such as the collars 94 and set screws 95 shown in Fig. 1. The end of rock shaft 93 adjacent the linkage has a forwardly and downwardly extending lift arm 96 fixed thereto for movement therewith, the lower end of the arm being pivotally secured to linkage 83 through means of a depending link 100. Actuation of shaft 93 is effected by means of a lever 97 which is fixed thereto and extends upward alongside a notched quadrant 98 fixedly carried by frame member 36. Lever 97 is provided with a conventional quadrant engaging latch rod 99, and in this connection it should be understood that the upper portion (not shown) of the lever preferably extends rearward to a point within easy reach of an operator seated at station 46. Furthermore, it should be understood that implement support linkage 83 and the lift mechanism comprising shaft 93, arm 96, and lever 97 are in general conventional apparatus and that therefore a more detailed description of this apparatus is believed unnecessary for a complete understanding of the present invention. The preferred arrangement for mounting a plow on the tractor is with the adjacent front wheel offset as shown in Fig. 1, so that the offset wheel travels in the previously cut furrow and the rear wheel on the same side of the tractor travels in the freshly cut furrow. The plow is then positioned between the front and rear wheels at a point wherein the resultant force of the horizontal components of draft and soil reaction on the moldboard passes through the rear axle approximately at the center line of the rear axle structure thus distributing the draft load equally between the two drive wheels.

Although shown as mounting a moldboard plow a tractor embodying the present invention is obviously equally adaptable for mounting other tools. For instance, it will be apparent that cultivating rigs or other tools may be attached to linkage 83 and thereby supported in depending relation with respect to cross bar 77 and that such rigs or tools will be sufficiently close to the front wheels to readily respond to a steering movement of these wheels. It will also be apparent that tools thus positioned afford the operator seated on station 46 an unrestricted close range view of the tools and/or plant rows.

It has been previously pointed out that the front axle structure affords a means for increment adjustment of the front wheel tread spacing to conform with any desired plant row spacing. In order to increase the utility of the tractor along this line it is necessary that there also be provided a means for correspondingly adjusting the rear wheel tread spacing so that the front and rear wheels may travel in longitudinally aligned relation between the same plant rows or in the same furrow. The illustrated embodiment of the present invention affords a means for varying the rear wheel tread spacing in a manner now to be described.

Figures 4, 7:
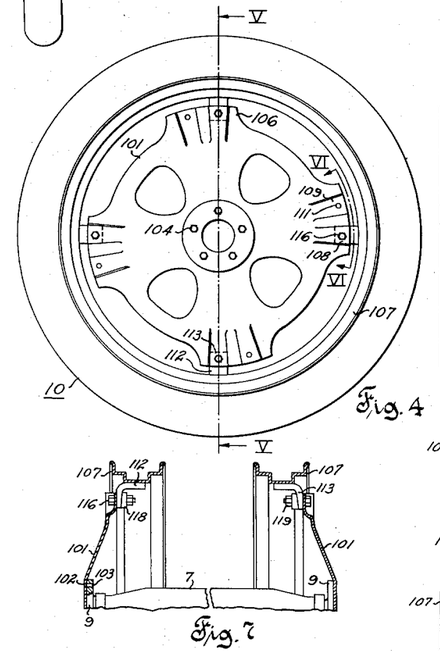
Fig. 4 is a side elevation of a rear traction wheel.
Figs. 7 to 10, inclusive, show some of the tread spacing adjustments afforded by the rear wheel rim and disk connections.
Figures 5, 6:
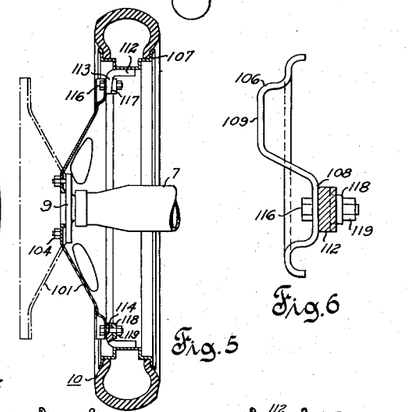
Fig. 5 is a section taken on line V—V of Fig. 4 with the addition of a dotted line showing the disk reversed on the hub.
Fig. 6 is a partial section taken on line VI—VI of Fig. 4.

Referring to Figs. 4 and 5, it will be seen that the disk-like central portion 101 (hereinafter called the disk) of rear wheel 10 is dished and secured to the axle hub portion 9 with its concave surface facing the tractor, the central portion of the disk having a series of circumferentially spaced holes 102 (Fig. 7) therethrough similarly arranged and alignable with the holes 103 in hub portion 9 for receiving the securing bolts 104. And in this connection it should be noted that the disk may be attached to the axle with either side of the disk facing out as shown in Fig. 5. The periphery of disk 101 has radially projecting portions 106 equally spaced circumferentially thereof, these portions being detachably connected with and operatively supporting a tire mounting rim unit 107.

As may be seen in Fig. 6 these projecting portions 106 of disk 101 present a generally S-shaped configuration when viewed along an edge of the disk. That is, each projection presents a pair of oppositely facing flat surfaces 108 and 109 symmetrically offset with respect to a vertical plane normal to the axis of rotation of wheel 10, each offset surface having a bolt receiving opening or hole 111 therethrough. The rim unit 107 is of a conventional type (see Fig. 5) with lugs 112 spaced circumferentially along the inner surface thereof to conform with the spacing of the offset surfaces presented by disk projections 106, these lugs being preferably permanently fastened to the rim in any suitable manner. Each lug has a portion 113 thereof offset with respect to the center line of the rim, this portion projecting inward toward the center of the wheel, and being shaped to side-abut a selected one of the laterally offset disk surfaces 108 and 109. This projecting portion 113 of lug 112 has a bolt receiving opening 114 therethrough adapted for alignment with any one of the bolt receiving openings 111 in the offset disk surfaces. Consequently to assemble the wheel, the openings in the lugs are brought into alignment with the openings in one set of offset surfaces of the disk and a bolt 116 is passed therethrough to rigidly fix the rim relative to the disk. It will be noted that the lug used in the illustrated embodiment of the present invention has an inclined surface 117 on one side of its projecting portion 113 and to compensate for this incline a spacer element 118 having an oppositely inclined surface is positioned between the lug and the nut 119 on the end of the bolt.

Figure 8:
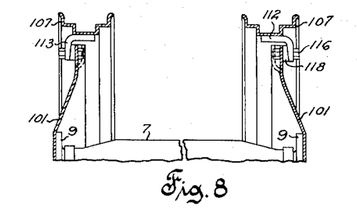
Figures 9, 10:
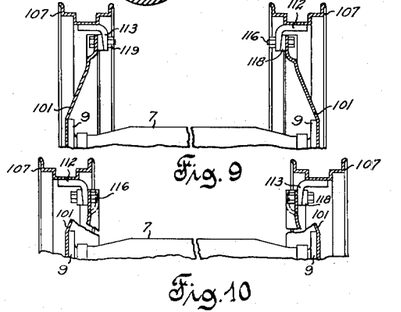

From the foregoing description of the wheel structure it will be seen that this construction affords a wide range of adjustment in tread spacing of the tractor rear wheels. For one tread spacing adjustment the rim and disk may be assembled as shown in Figs. 4 and 7 with the concave surface of the disk 101 facing toward the longitudinal center line of the tractor, with the rim 107 offset inwardly with respect to the disk, and with lug portions 113 fastened to the offset flat surfaces 108 of the disk on the side nearest the center line of the tractor. A second adjustment can be made by removing lug bolts 116, circumferentially rotating rim unit 107 in a counterclockwise direction, and then axially shifting the rim unit outwardly to a position where lug 113 abuts the outside face of the alternate disk offset surface 109, as shown in Fig. 8. A third adjustment is afforded by removing the lug bolts 116, reversing rim unit 107 so that the lug offset portion 113 faces outwardly with respect to the tractor center line, circumferentially rotating the rim unit 107 clockwise, and then axially shifting rim unit 107 inwardly with respect to the tractor center line to a position wherein the lug offset portion 113 abuts the inner face of disk offset surface 108, as pictured in Fig. 9. A fourth adjustment can be made by removing lug bolts 116, circumferentially rotating the rim unit 107 in a counterclockwise direction, and then axially shifting rim unit 107 outwardly to a position wherein lug portion 113 abuts the outer face of disk offset surface 109, as shown in Fig. 10. It being understood, of course, that it is necessary to jack-up the axle structure in the usual manner when making such adjustments.

In addition to the four adjustments just described, it will be seen that further adjustment can be had for each of these positions by removing the lug bolts 116 and reversing the rim 107 relative to the disk 101 and replacing it on the same offset surface of the disk. At this point there has been provided eight increments of axial adjustment for each rear wheel, all afforded by shifting the rim relative to the disk. Looking now at Fig. 5 it will be seen that eight additional adjustments can be similarly obtained with the disk 101 disposed in reversed position on axle hub portion 9, that is, in the position indicated by the dotted line showing of Fig. 5.

In all of the above described combinations for adjusting the rear wheel tread spacing the spacer element 118 is positioned with its inclined surface abutting the oppositely inclined surface 117 of the lug projecting portion on the rim. Therefore, it is obvious that a still greater number of variations in tread spacing can be achieved by using spacer elements having a different thickness than that shown in the drawings. This is an important feature in that it permits corresponding increment adjustment of the front and rear wheel tread spacing to conform with any desired plant row spacing so that the front and rear wheels can travel in longitudinally aligned relation between the same plant rows or in the same furrow.

Referring again to Figs. 1 and 2 it will be noted that a tractor embodying the present invention affords adequate ground clearance for working with vegetables and other crops, and still it has a low overall height insuring lateral stability and maneuverability of the tractor. This is achieved principally through the positioning of the engine to the rear of the tractor with the operator's station disposed between the driving wheels in adjacent overlying relation with respect to the frame structure, and through the use of wide front and rear axle structures including a rigid transverse front axle member (either a single bar element as shown or a fabricated structure) having a midportion thereof secured to a forward end portion of the elongated rigid frame structure and projecting laterally beyond the opposite sides thereof with opposite end portions of the transverse rigid axle member supported on depending dirigible wheel structures positioning this member on a horizontal level approximately equal to the horizontal level of the rear axle shafts.

In addition, it should be noted that tool bar 77 is disposed generally along a transverse line directly behind and parallel to the front axle structure, that is, the tools to be mounted thereon will be positioned in the area between and directly behind the front dirigible wheels and will closely follow the steering movements of these wheels. Furthermore, it should also be noted that insofar as the tractor and implement supports are concerned, an operator seated at station 46 is afforded a practically unrestricted close range view of the plant rows and tools along a line of sight sufficiently forward to obtain excellent steerability. These features are also important both separately and collectively in that implements or tools disposed ahead of a tractor a distance sufficient to insure good visibility invariably fail to respond quickly to steering movements of the front dirigible wheels and are therefore impractical for the complete cultivation of closely spaced plant rows, and that it is impractical to steer any tractor with sufficient accuracy for efficiently effecting complete cultivation of closely spaced plant rows, even if the rows are straight, by looking downward toward the ground immediately in front of the operator's station. In this respect it will be noted that the illustrated embodiment of the invention, while affording a line of vision looking forwardly toward tools mounted beneath the front portion of the tractor, maintains a relatively short wheel base length which is important for sharp turns at the end of each plant row and also as to the matter of reducing both weight and cost.

Another feature contributing to the advantages hereinbefore pointed out is the positioning of the operator's station 46 in adjacent overlying relation to a rear portion of tubular frame member 36 so that the legs of an operator seated at the station normally straddle member 36 as this feature materially lowers the center of gravity and directs the operator's line of vision, when looking toward the ground directly behind and between the front dirigible wheels, sufficiently forward to obtain excellent steerability. In addition, this arrangement permits locating the foot pedal controls in readily accessible relation to the operator's feet so that these controls may be actuated, as desired, without the operator looking away from the plant row and/or tools. Furthermore, the location of the operator's station in adjacent forward relation to the power unit and transmission also permits positioning the usual controls therefor for ready actuation by an operator seated at station 46 without in any manner affecting steerability.

Moreover, it will be noted that the tractor frame and axle structures, while affording adequate ground clearance for working with the tractor astride the plant rows, also provides a means, in the form of a forwardly positioned radius rod 64, for diverting crops standing at a level higher than the front axle structure away from the central forward structure of the tractor and thereby prevent fouling of the linkage and gears disposed in and below steering control housing 49.

Some of the features pointed out as affording particular advances in the art have particular utility in the construction and operation of small light weight farm tractors while other of the features are of more general application. And it should therefore be understood that it is not intended to limit the invention to the exact construction herein shown and described for purposes of illustration, as various modifications within the scope of the appended claims may occur to persons skilled in the art.

It is claimed and desired to secure by Letters Patent:

1. In a farm tractor having a rear driving unit, a wide front axle structure, an elongated narrow frame structure operatively uniting said rear driving unit with a midportion of said front axle structure, and steering control means for said front axle structure disposed at the forward end portion of said narrow frame structure, the combination comprising a radius rod having a midportion thereof disposed in advance of said steering control means and being secured to the front end of said elongated frame structure for relative pivotal movement about a horizontal axis lying in a vertical plane common to the longitudinal axis of said frame structure, said radius rod curving rearward and outward in symmetrical relation with respect to said plane with its ends fixedly connected to laterally spaced portions of said front axle structure, and said radius rod functioning to direct standing plants exceeding the height of said front axle structure and straddled thereby laterally outward from said steering control means.

2. A farm tractor comprising a rear driving unit including a housing having axially aligned oppositely projecting portions each enclosing an axle shaft mounting a drive wheel at the outer end thereof, an engine carried by said housing in rearwardly extending relation thereto and drivingly connected with said drive wheels, an elongated narrow rigid frame extending forward from said housing, a wide front axle member secured to a forward end portion of said frame structure, a pair of wheels dirigibly mounted on opposite end portions of said front axle member, steering control means disposed at the forward portion of said frame structure and operably connected with said front wheels, and a radius rod having a midportion thereof disposed in advance of said steering control means and being secured to the front end of said elongated frame structure for relative pivotal movement about a horizontal axis lying in a vertical plane common to the longitudinal axis of said frame structure, said radius rod curving rearward and outward in symmetrical relation with respect to said plane with its ends fixedly connected to opposite end portions of said front axle member, and said radius rod functioning to direct standing plants exceeding the height of said front axle structure and straddled thereby outward from said steering control means.

3. A farm tractor comprising a rear driving unit including a housing having axially aligned oppositely projecting portions each enclosing an axle shaft mounting a drive wheel at the outer end thereof, an engine carried by said housing in rearwardly disposed relation thereto, said engine being operatively connected with said drive wheels and supported by having its forward end fixedly united with a rear portion of said housing, an elongated narrow rigid frame extending forward from said housing, a dirigible wheel structure supporting the forward portion of said elongated frame, said elongated frame extending forward from said housing a distance sufficient to provide a tillage tool mounting space of practical extent longitudinally of the tractor and in advance of the forward side of said housing, said distance being such as to afford an operator seated on said tractor in adjacent overlying relation to a forward portion of said housing a practically unrestricted forward-looking and close range view of the ground between said dirigible wheel and said housing structure, an operator's seating station mounted on said tractor in front of said engine and in adjacent overlying relation to said forward portion of said housing, and steering means operatively associated with said dirigible wheel structure and extending rearward therefrom to a point within easy reach of an operator seated at said station.

4. A farm tractor comprising a rear driving unit including a housing having axially aligned oppositely projecting portions each enclosing an axle shaft mounting a drive wheel at the outer end thereof, an engine carried by said housing in rearwardly extending relation thereto with the forward end of said engine disposed to the rear of the axis of rotation of said drive wheels, said engine being drivingly connected with said wheels, an elongated narrow rigid frame extending forward from said housing, a dirigible wheel structure supporting the forward portion of said elongated frame, said elongated frame extending forward from said housing a distance sufficient to provide a tillage tool mounting space of practical extent longitudinally of the tractor and in advance of the forward side of said housing, said distance being such as to afford an operator seated on said tractor in adjacent overlying relation to a portion of said housing forward of said axis a practically unrestricted forward-looking and close range view of the ground between said dirigible wheel structure and said housing structure, an operator's seating station mounted on said tractor in front of said engine and in adjacent overlying relation to said forward portion of said housing, and steering means operatively associated with said dirigible wheel structure and extending rearward therefrom to a point within easy reach of an operator seated at said station.

5. A farm tractor comprising a rear driving unit including a housing having axially aligned oppositely projecting portions each enclosing an axle shaft mounting a drive wheel at the outer end thereof, an engine carried by said housing in rearwardly extending relation thereto with the forward end of said engine disposed to the rear of the axis of rotation of said drive wheels, said engine being operatively connected with said wheels, an elongated narrow rigid frame extending forward from said housing, a wide front axle structure operatively connected to a forward end portion of said elongated frame structure and having a pair of dirigible wheels mounted on opposite ends thereof, said elongated frame extending forward from said housing a distance sufficient to provide a tillage tool mounting space of practical extent longitudinally of the tractor and in advance of the forward side of said housing, said distance being such as to afford an operator seated on said tractor in adjacent overlying relation to a portion of said housing forward of said axis of rotation a practically unrestricted forward-looking and close range view of the ground between said front axle and housing structures, an operator's seating station mounted on said tractor in front of said engine and in adjacent overlying relation to said forward portion of said housing, and steering means operatively associated with said dirigible wheels and extending rearward therefrom to a point within easy reach of an operator seated at said station.

6. A farm tractor comprising a rear driving unit including a housing having axially aligned oppositely projecting portions each enclosing an axle shaft mounting a drive wheel at the outer end thereof, an engine carried by said housing in rearwardly disposed relation thereto, said engine being operatively connected with said drive wheels and supported by having its forward end fixedly united with a rear portion of said housing, an elongated narrow rigid frame structure extending forward from a midportion of said housing, a brake and clutch pedal means controlling the transmission of power to said axle shafts and mounted on said tractor with said pedals disposed in general lateral alignment adjacent opposite rear side portions of said frame structure, a dirigible wheel structure supporting the forward portion of said elongated frame structure, said elongated frame extending forward from said housing a distance sufficient to provide a tillage tool mounting space of practical extent longitudinally of the tractor and in advance of the forward side of said housing, said distance being such as to afford an operator seated on said tractor in adjacent overlying relation to a forward portion of said housing a practically unrestricted forward-looking and close range view of the ground between said dirigible wheel structure and said forward portion of said housing and such that the legs of an operator when so seated will normally straddle said frame structure with the operator's feet disposed for ready engagement with said pedals, an operator's seating station mounted on said tractor rearwardly of said pedals in adjacent overlying relation to said forward portion of said housing, and a steering shaft having its forward end operatively connected with said dirigible wheel structure adjacent the forward end of said frame and extending rearward and upward therefrom to a point overlying said pedal means and within easy reach of the operator seated at said station.

7. A farm tractor comprising a rear driving unit including a wide rear axle structure, a pair of drive wheels supportingly mounted on opposite end portions of said rear axle structure, an engine carried by said rear axle structure in rearwardly extending relation thereto with a forward end of said engine disposed to the rear of the axis of rotation of said drive wheels, said engine being drivingly connected with said wheels, an elongated narrow frame structure extending forward from said rear axle structure, a wide front axle member secured to a forward end portion of said frame structure with opposite end portions of said member disposed in general horizontal alignment with respect to the midportion thereof, a pair of wheels dirigibly mounted on opposite end portions of said front axle member in depending supporting relation thereto, said dirigible wheels positioning said front axle member and said elongated frame on a level approximately equal to the level of said rear axle structure, said elongated frame extending forward from said rear axle structure a distance sufficient to provide a tillage tool mounting space of practical extent longitudinally of the tractor and in advance of the forward side of said axle structure, said distance being such as to afford an operator seated on said tractor in adjacent overlying relation to a portion of said rear axle structure forward of said axis a practically unrestricted forward-looking and close range view of the ground between said dirigible wheels and said housing structure, an operator's seating station mounted on said tractor in front of said engine and in adjacent overlying relation to a portion of said rear axle structure in advance of said axis, and steering means operatively associated with said dirigible wheels and extending rearward therefrom to a point within easy reach of an operator seated at said station.

8. A farm tractor comprising a rear driving unit including a wide rear axle structure, a pair of drive wheels supportingly mounted on opposite end portions of said rear axle structure, an engine carried by said rear axle structure in rearwardly disposed relation thereto, said engine being operatively connected with said drive wheels and supported by having its forward end fixedly united with a rear portion of said axle structure, an elongated narrow frame structure extending forward from said axle structure, a wide front axle member secured to a forward end portion of said frame structure with opposite end portions thereof disposed in general horizontal alignment with the midportion thereof, a pair of wheels dirigibly mounted on opposite end portions of said front axle member in depending supporting relation thereto, said dirigible wheels positioning said front axle member and said elongated frame structure on a level approximately equal to the level of said rear axle structure, said elongated frame extending forward from said rear axle structure a distance sufficient to provide a tillage tool mounting space of practical extent longitudinally of the tractor and in advance of the forward side of said axle structure, said distance being such as to afford an operator seated on said tractor in adjacent overlying relation to a forward portion of said rear axle structure a practically unrestricted forward-looking and close range view of the ground between said dirigible wheels and the forward side of said rear axle structure, an operator's seating station mounted on said tractor between said drive wheels in front of said engine and in adjacent overlying relation to a forward portion of said rear axle structure, and a steering means operatively associated with said dirigible wheels and extending rearward therefrom to a point within easy reach of an operator seated at said station.

9. A farm tractor comprising a wide rear axle structure, a pair of drive wheels supportingly mounted on opposite end portions of said rear axle, an engine carried by said rear axle structure in rearwardly disposed relation thereto, said engine being operatively connected with said drive wheels and supported by having its forward end fixedly united with a rear portion of said axle structure, a variable speed power transmission unit disposed in adjacent forward relation to said rear axle structure and operable to convey power from said engine to said drive wheels, an elongated narrow frame structure extending forward from said transmission unit, a wide front axle member secured to a forward end portion of said frame structure with opposite end portions thereof disposed in general horizontal alignment with the midportion thereof, a pair of wheels dirigibly mounted on opposite end portions of said front axle member in depending supporting relation thereto, said dirigible wheels positioning said front axle member and said elongated frame structure on a level approximately equal to the level of said rear axle structure, said elongated frame extending forward from said rear axle structure a distance sufficient to provide a tillage tool mounting space of practical extent longitudinally of the tractor and in advance of said axle structure, said distance being such as to afford an operator seated on said tractor in adjacent overlying relation to the adjoining portions of said elongated frame and transmission unit a practically unrestricted forward looking and close range view of the ground between said dirigible wheels and said adjoining portions, an operator's seating station mounted on said tractor in front of said engine and in adjacent overlying relation to adjoining portions of said elongated frame and transmission unit, and a steering means operatively associated with said dirigible wheels and extending rearward therefrom to a point within easy reach of an operator seated at said station.

10. A farm tractor comprising a rear driving unit including a housing having oppositely projecting portions each enclosing an axle shaft mounting a drive wheel at opposite ends thereof, an engine carried by said housing in rearwardly disposed relation thereto, said engine being operatively connected with said drive wheels and supported by having its forward end fixedly united with a rear portion of said housing, an elongated narrow rigid frame structure extending forward from a midportion of said housing, a brake and clutch pedal means controlling the transmission of power to said axle shafts and mounted on said tractor with said pedals disposed in general lateral alignment adjacent opposite rear side portions of said frame structure, a dirigible wheel structure supporting the forward portion of said elongated frame structure, said elongated frame extending forward from said housing a distance sufficient to provide a tillage tool mounting space of practical extent longitudinally of the tractor and in advance of the forward side of said housing, said distance being such as to afford an operator seated on said tractor in adjacent overlying relation to a forward portion of said housing a practically unrestricted forward-looking and close range view of the ground between said dirigible wheel structure and said housing, an operator's seating station mounted on said tractor in adjacent overlying relation to said forward portion of said housing and in rearwardly disposed relation with respect to said pedals so that the legs of an operator seated at said station normally straddle said frame structure with the operator's feet disposed for ready engagement with said pedals, and a steering mechanism operatively connected with said dirigible wheel structure and extending rearward therefrom in general vertical alignment with said rigid frame and to a point within easy reach of an operator seated at said station.

11. A farm tractor comprising a rear driving unit including a housing structure mounting a traction means supporting same, an engine carried by said housing in rearwardly disposed relation thereto, said engine being operatively connected with said traction means and supported by having its forward end fixedly united with a rear portion of said housing, a separable unitary frame structure comprising an elongated rigid member detachably fixedly secured to the forward portion of said housing and extending forwardly therefrom, a dirigible wheel structure supporting the forward portion of said separable frame, said frame extending forward from said housing a distance sufficient to provide a tillage tool mounting space of practical extent longitudinally of the tractor and in advance of the forward portion of said housing, said distance being such as to afford an operator seated on said tractor in adjacent overlying relation to a forward portion of said housing a practically unrestricted forward-looking and close range view of the ground between said dirigible wheel structure and said housing, an operator's seating station mounted on said tractor in front of said engine and in adjacent overlying relation to said forward portion of said housing, and a steering mechanism operatively connected with said dirigible wheel structure and extending rearward therefrom in general vertical alignment with said rigid frame and to a point within easy reach of an operator seated at said station.

12. A farm tractor comprising a rear driving unit including a housing structure mounting a traction means supporting same, an engine carried by said housing in rearwardly disposed relation thereto, said engine being drivingly connected with said traction means and supported by having its forward end fixedly secured to a rear portion of said housing, a unitary frame structure comprising an elongated rigid member, means detachably fixedly securing the rearward portion of said frame structure to the forward portion of said housing to thereby afford the sole support for said rearward portion of the frame structure, a dirigible wheel structure supporting the forward portion of said frame structure, said elongated frame extending forward from said housing a distance sufficient to provide a tillage tool mounting space of practical extent longitudinally of the tractor and in advance of the forward portion of said housing, said distance being such as to afford an operator seated on said tractor in adjacent overlying relation to a forward portion of said housing a practically unrestricted forward-looking and close range view of the ground between said dirigible wheel structure and the forward portion of said housing, an operator's seating station positioned on said tractor in front of said engine and in adjacent overlying relation to said forward portion of said housing, and a steering means operatively associated with said dirigible wheel and extending rearward therefrom to a point within easy reach of an operator seated at said station.

13. A farm tractor comprising a wide rear axle structure, a pair of drive wheels mounted on opposite end portions of said rear axle, an engine carried by said rear axle structure in rearwardly extending relation thereto with the front end of said engine disposed to the rear of the axis of rotation of said wheels, a variable speed power transmission unit fixedly united with said rear axle structure and terminating in a forward portion disposed in proximity to the forward side of said axle structure, said unit being operable to convey power from said engine to said drive wheels, an elongated narrow frame structure, means detachably fixedly securing one end of said frame structure to said forward portion of said unit and thereby affording the sole support for said one end of the frame structure, a wide front axle member secured to the other end portion of said frame structure with opposite end portions of said front axle member disposed in general horizontal alignment with respect to the midportion thereof, a pair of wheels dirigibly mounted on opposite end portions of said front axle member in depending supporting relation thereto, said dirigible wheels positioning said front axle member and said elongated frame structure on a level approximately equal to the level of said rear axle structure, said frame structure extending forward from said unit a distance sufficient to provide a tillage tool mounting space of practical extent longitudinally of the tractor and in advance of said unit, said distance being such as to afford an operator seated on said tractor in adjacent overlying relation to the adjoining portions of said frame and transmission unit a practically unrestricted forward-looking and close range view of the ground between said dirigible wheels and the forward portion of said unit, an operator's seating station mounted on said tractor in front of said engine and in adjacent overlying relation to adjoining portions of said elongated frame and unit, and a steering means operatively associated with said dirigible wheels and extending rearward therefrom to a point within easy reach of an operator seated at said station.

WALTER F. STREHLOW.

REFERENCES CITED

The following references are of record in the file of this patent:

UNITED STATES PATENTS

| Number | Name | Date |
|---|---|---|
| 729,737 | Collins | June 2, 1903 |
| 1,415,356 | Jandasek | May 9, 1922 |
| 1,566,229 | Scanlan | Dec. 15, 1925 |
| 1,648,076 | Stripling | Nov. 8, 1927 |
| 1,818,468 | Fickenscher | Aug. 11, 1931 |
| 1,903,694 | Burney | Apr. 11, 1933 |
| 1,915,816 | Cole | June 27, 1933 |
| 2,066,666 | Becker | Jan. 5, 1937 |
| 2,074,685 | Engstrom | Mar. 23, 1937 |
| 2,173,419 | Johnson | Sept. 19, 1939 |
| 2,305,305 | Porsche | Dec. 15, 1942 |
| 2,374,911 | Barenyi et al. | May 1, 1945 |
| 2,378,615 | Brown | June 19, 1945 |
| 2,413,355 | Johnson | Dec. 31, 1946 |
| 2,513,942 | Johnson et al. | July 4, 1950 |

FOREIGN PATENTS

| Number | Country | Date |
|---|---|---|
| 125,793 | Austria | Dec. 10, 1931 |
| 642,192 | Germany | Feb. 25, 1937 |